(12) United States Patent  (10) Patent No.: US 6,645,669 B2
White et al.  (45) Date of Patent: Nov. 11, 2003

(54) BATTERY PACK AND METHOD FOR CONSTRUCTING SAME

(75) Inventors: Daniel J. White, Baltimore, MD (US); Paul S. White, Ellicott City, MD (US); Adam M. Casalena, Baltimore, MD (US)

(73) Assignee: Black & Decker Inc., Newark, DE (US)

( * ) Notice: Subject to any disclaimer, the term of this patent is extended or adjusted under 35 U.S.C. 154(b) by 0 days.

(21) Appl. No.: 10/183,296

(22) Filed: Jun. 27, 2002

(65) Prior Publication Data

US 2003/0006731 A1 Jan. 9, 2003

Related U.S. Application Data

(60) Provisional application No. 60/303,496, filed on Jul. 6, 2001.

(51) Int. Cl.$^7$ .................................................. H01M 6/42
(52) U.S. Cl. ..................................................... 429/158
(58) Field of Search ............................. 29/592, 623.1, 29/623.4; 429/99, 158, 160, 159; 219/65.22; 228/901, 58

(56) References Cited

U.S. PATENT DOCUMENTS

| 2,575,976 A | * | 11/1951 | Rock ........................... 429/160 |
| 3,427,202 A | * | 2/1969 | Wilke |
| 3,810,790 A | * | 5/1974 | Denis .......................... 429/158 |
| 5,308,717 A | * | 5/1994 | Gordin ......................... 429/99 |
| 5,607,793 A | * | 3/1997 | Alexandres et al. ......... 429/158 |

\* cited by examiner

Primary Examiner—Neil Abrams
(74) Attorney, Agent, or Firm—Adan Ayala

(57) ABSTRACT

An improved battery pack is proposed. The battery pack includes a housing, and first and second cells disposed in the housing, the first cell having a radius and a periphery. In addition, the battery pack includes a metal strap connecting the first and second cells, the strap having an end disposed over the first cell and a portion of the periphery, and two contact protrusions contacting the first cell, wherein distance between the strap end and the overlaped periphery is greater than the radius of the first cell.

10 Claims, 2 Drawing Sheets

BATTERY PACK AND METHOD FOR CONSTRUCTING SAME

CROSS-REFERENCE TO RELATED APPLICATIONS

The present application derives priority under 35 USC §119(e) from U.S. Application Serial No. 60/303,496, filed Jul. 6, 2001, now pending.

BACKGROUND OF THE INVENTION

The present invention relates to battery packs and a method for constructing the same.

Referring to FIG. 3, battery pack 10 typically has rechargeable cells 11 connected in series and/or parallel via connectors, such as metal straps 13. The cells 11 may be held together by a plenum or plate 12. The straps 13 may be disposed between the plate 12 and cells 11. Alternatively, plate 12 may be disposed between cells 11 and straps 13, whereas the straps 13 contact the cells 11 through holes in plate 12.

This assembly is then disposed in a housing 15. Cables or wires connected to cells 11 may extend into a terminal block 14, which allows the battery pack 10 to be connected to electric and/or electronic devices such as power tools, chargers, cellular telephones, etc.

Referring to FIGS. 1 and 3, typical cells 11 include cells produced by Sanyo Energy, such as model no. N2400. Such cells 11 may have weld area 11W, where the negative collector inside the cell is welded to the exterior can during the production of cell 11. This process may be done from the outside of the cell 11 using a laser. After the weld is completed, a weld area 11W having a diameter of about 4 or 5 millimeters is left. This weld area 11W may be sensitive to exterior pressure, heat, and electrical current.

During the construction of battery pack 10, cells 11 are typically welded together using double protrusion nickel straps 13, which have protrusions 13P. During the welding process, a strap electrode 16S is disposed on strap 13 while cell electrode 16 contacts the cell 11 directly. Current is passed through strap electrode 16S, strap 13 and out the cell 11 into cell electrode 16C, resulting in heat and finally welding.

This is problematic because cell electrode 16C partially or completely contacts weld area 11W of cell 11. This welding process may result in early cell failure.

SUMMARY OF THE INVENTION

An improved battery pack is proposed. The battery pack comprises a housing, and first and second cells disposed in the housing, the first cell having a radius and a periphery. In addition, the battery pack comprises a metal strap connecting the first and second cells, the strap having an end disposed over the first cell and a portion of the periphery, and two contact protrusions contacting the first cell, wherein distance between the strap end and the overlaped periphery is greater than the radius of the first cell.

Also disclosed is a method for manufacturing a battery pack comprising the steps of providing two cells, at least one cell having a weld area, welding a strap therebetween, and disposing the cells in a housing, wherein the strap is welded by disposing a first electrode on the strap and a second electrode on the at least one cell outside of the weld area, and providing a current between the first and second electrodes.

Additional features and benefits of the present invention are described, and will be apparent from, the accompanying drawings and the detailed description below.

BRIEF DESCRIPTION OF THE DRAWINGS

The accompanying drawings illustrate preferred embodiments of the invention according to the practical application of the principles thereof, and in which:

FIG. 1 illustrates a prior art welding process, where

FIG. 2 illustrates the welding process according to the present invention, where

FIG. 4 illustrates alternate embodiments of the present invention, where

DETAILED DESCRIPTION

The following embodiments for the battery pack and methods for manufacturing the same are described below, persons skilled in the art should recognize that like numerals refer to like parts.

Figure 1A:
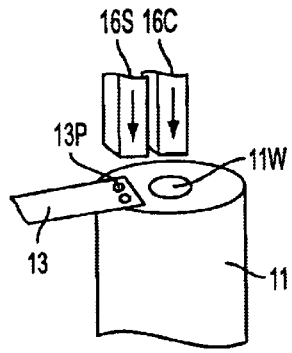
FIG. 1A shows a perspective view of the welding process.
Figure 1B:
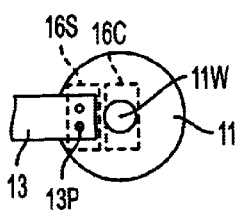
FIG. 1B shows a partial top plan view of the welding process.
Figure 1C:
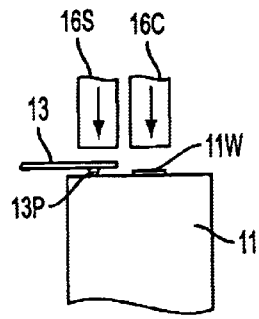
FIG. 1C shows a side view of the welding process.
Figure 2A:
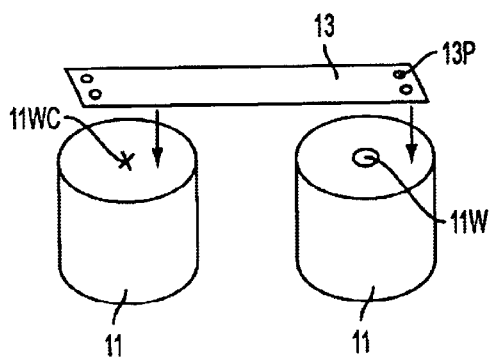
FIG. 2A is a perspective view of the welding process according to the invention.
Figure 2B:
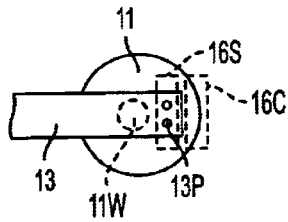
FIG. 2B is a partial top plan view of the welding process according to the invention.
Figure 2C:
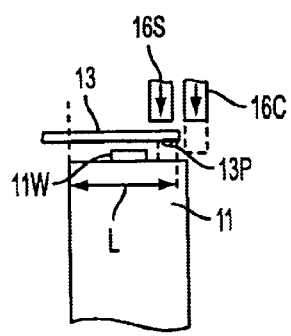
FIG. 2C is a side view of the welding process according to the invention.
Figure 3:
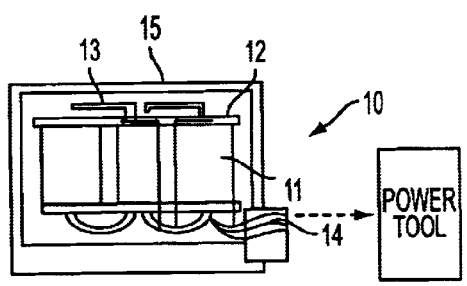
FIG. 3 illustrates a typical battery pack.

FIGS. 2–3 illustrate a first embodiment of the present invention. In this embodiment, rechargeable cells 11 are connected by straps 13. Persons skilled in the art should recognize that cell 11 may be nickel metal-hydride (NiMH) or nickel-cadmium (NiCd) cell.

As in the prior art, cells 11 may be connected in series and/or parallel. The cells 11 may then be held together by a plate 12. The straps 13 maybe disposed between the plate 12 and cells 11. Alternatively, plate 12 may be disposed between cells 11 and straps 13, whereas the straps 13 contact the cells 11 through holes in plate 12.

Preferably, strap 13 with protrusions 13P is welded onto cell 11. As in the prior art, the strap electrode 16S is disposed on the strap 13. Cell electrode 16C however is disposed on an area of cell 11 outside of weld area 11W. Preferably, this area is near the periphery of the top surface of the cell 11.

Persons skilled in the art should recognize that it may be preferable to increase the length of strap 13 in order to provide a position for contact electrode 16C outside of the weld area 11W. Accordingly, if length L is defined as the distance between one end of strap 13 and the periphery of cell 11 (see FIG. 2C), length L is preferably larger than the radius of cell 11.

Persons skilled in the art should also recognize that it may be preferable to increasing the length of strap 13 so that its length is longer than the distance between the two centers of adjacent cells (11W and/or 11WC in FIG. 2A). This could also result in longer battery life. This is because, with a longer strap 13, any axial movement of cell 11 due to vibration will result in a smaller angle of movement for the strap 13 between the start and end positions of cell 11. This would decrease fatigue wear on strap 13, increasing battery life.

This assembly is then disposed in a housing 15. Cables or wires connected to cells 11 may extend into a terminal block 14, which allows the battery pack 10 to be connected to electric and/or electronic devices such as power tools, chargers, cellular telephones, etc.

Figure 4A:
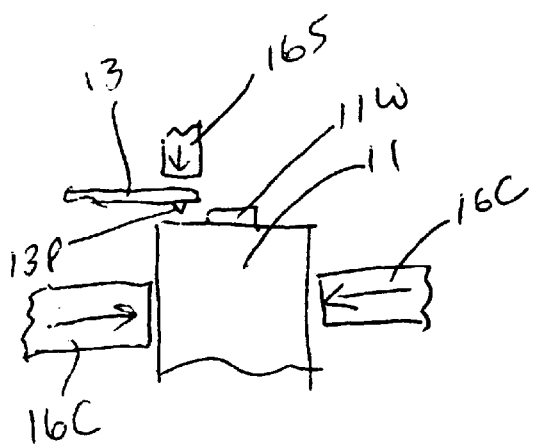
FIG. 4A is a side view of a second embodiment according to the present invention and FIG. 4B is a side view of a third embodiment according to the invention.
Figure 4B:
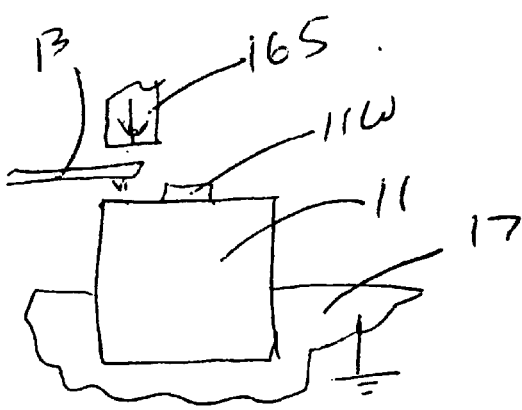

Persons skilled in the art should recognize that other alternatives to this method of construction area available. For example, referring to FIG. 4A, cell electrodes 16C may be disposed on the side of cell 11. Alternatively, cell 11 may be disposed in a fixture 17 which may be grounded. This would provide a exit path for current going through strap electrode 16S, strap 13 and cell 11.

Persons skilled in the art may recognize other alternatives to the means disclosed herein. However, all these additions and/or alterations are considered to be equivalents of the present invention.

We claim:

1. A battery pack comprising:

a housing;

first and second cells disposed in the housing, the first cell having a terminal side with a center, a weld area on or near the center, a radius and a periphery; and a metal strap electrically connected to the first and second cells by a solderless welding operation where a first electrode contacts the strap and a second electrode contacts the first cell, the first and second electrodes not contacting the weld area, the strap being connected to the first cell at a weld point not on the weld area, the strap being disposed over the weld area and a portion of the periphery of the first cell, wherein distance between the weld point and the edge of the overlapped portion of the periphery is greater than the radius of the first cell.

2. The battery pack of claim 1, wherein the strap comprises two contact protrusions contacting the first cell.

3. The battery pack of claim 1, wherein the first and second cells have a nickel metal-hydride or nickel cadmium chemistry.

4. The battery pack of claim 1, wherein at least one of the first and second cells is supported by a plate.

5. The battery pack of claim 1, further comprising a terminal disposed on the housing, the terminal being electrically connected to at least one of the first and second cells.

6. A cordless system comprising:

a power tool;

a battery pack electrically connected to the power tool; the battery pack comprising:

a housing;

first and second cells disposed in the housing, the first cell having a terminal side with a center, a weld area on or near the center, a radius and a periphery; and a metal strap electrically connected to the first and second cells by a solderless welding operation where a first electrode contacts the strap and a second electrode contacts the first cell, the first and second electrodes not contacting the weld area, the strap being connected to the first cell at a weld point not on the weld area, the strap being disposed over the weld area and a portion of the periphery of the first cell, wherein distance between the weld point and the edge of the overlapped portion of the periphery is greater than the radius of the first cell.

7. The cordless system of claim 6, wherein the strap comprises two contact protrusions contacting the first cell.

8. The cordless system of claim 6, wherein the first and second cells have a nickel metal-hydride or nickel cadmium chemistry.

9. The cordless system of claim 6, wherein at least one of the first and second cells is supported by a plate.

10. The cordless system of claim 6, further comprising a terminal disposed on the housing, the terminal being electrically connected to at least one of the first and second cells.

* * * * *